(12) United States Patent
Grosskopf

(10) Patent No.: US 11,808,304 B2
(45) Date of Patent: Nov. 7, 2023

(54) GENERATOR ASSEMBLIES, INTEGRATED DRIVE GENERATORS, AND METHODS OF MAKING GENERATOR ASSEMBLIES

(71) Applicant: Hamilton Sundstrand Corporation, Charlotte, NC (US)

(72) Inventor: Andrew P. Grosskopf, Rockford, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 17/585,807

(22) Filed: Jan. 27, 2022

(65) Prior Publication Data

US 2022/0145938 A1    May 12, 2022

Related U.S. Application Data

(62) Division of application No. 16/694,548, filed on Nov. 25, 2019, now Pat. No. 11,268,575.

(51) Int. Cl.
| | | |
|---|---|---|
| *H02K 5/173* | (2006.01) | |
| *F16C 39/02* | (2006.01) | |
| *F16C 32/04* | (2006.01) | |
| *F03D 80/70* | (2016.01) | |

(Continued)

(52) U.S. Cl.
CPC .......... *F16C 39/02* (2013.01); *F16C 32/0442* (2013.01); *F03D 80/70* (2016.05);

(Continued)

(58) Field of Classification Search
CPC .......... H02K 5/00; H02K 5/17; H02K 5/1732; H02K 7/00; H02K 7/08; H02K 7/083;

(Continued)

(56) References Cited

U.S. PATENT DOCUMENTS

| | | | | |
|---|---|---|---|---|
| 851,419 | A | * | 4/1907 | Hess ................ F16D 1/096 |
| | | | | 384/538 |
| 4,315,442 | A | | 2/1982 | Cordner |

(Continued)

FOREIGN PATENT DOCUMENTS

| | | |
|---|---|---|
| DE | 880235 C | 6/1953 |
| EP | 2093439 A1 | 8/2009 |

(Continued)

OTHER PUBLICATIONS

European Search Report for Application No. 20205643.8, dated Apr. 6, 2021, 63 pages.

*Primary Examiner* — Tran N Nguyen
(74) *Attorney, Agent, or Firm* — CANTOR COLBURN LLP

(57) ABSTRACT

A generator assembly includes a rotor carrying a magnetic element, a bearing assembly supporting the rotor for rotation about a rotation axis, a bearing support structure extending circumferentially about the bearing assembly and configured for fixation to a housing, and a sleeve member. The sleeve member is arranged radially between the bearing assembly and the bearing support structure to limit a clearance defined radially between the bearing assembly and the bearing support structure. Integrated drive generators and methods of making generator assemblies are also described.

14 Claims, 5 Drawing Sheets

(51) Int. Cl.
 *F16C 19/06* (2006.01)
 *F16C 27/04* (2006.01)
(52) U.S. Cl.
 CPC ........ *F05D 2220/323* (2013.01); *F16C 19/06* (2013.01); *F16C 27/04* (2013.01); *F16C 2300/14* (2013.01); *F16C 2380/26* (2013.01); *H02K 5/1732* (2013.01)
(58) Field of Classification Search
 CPC .......... F16C 35/00; F16C 35/04; F16C 35/06; F16C 35/063; F16C 35/067; F16C 35/07; F16C 35/073; F16C 35/077; F16C 25/00; F16C 25/06; F16C 25/08; F16C 25/083; F16C 33/00; F16C 33/58; F16C 33/586; F16D 1/00; F16D 1/09; F16D 1/096
 See application file for complete search history.

(56) References Cited

U.S. PATENT DOCUMENTS

| | | | |
|---|---|---|---|
| 4,603,983 A * | 8/1986 | Hofmann | F16C 35/077 384/512 |
| 4,606,658 A * | 8/1986 | Hofmann | F16C 33/416 384/510 |
| 5,053,661 A | 10/1991 | Kitamura et al. | |
| 5,868,503 A * | 2/1999 | Bade | F16C 27/066 384/582 |
| 5,947,612 A | 9/1999 | Dennison Buck et al. | |
| 7,448,952 B2 | 11/2008 | Kuczera et al. | |
| 8,145,097 B2 | 3/2012 | Yamazaki et al. | |
| 9,410,611 B2 | 8/2016 | Rittmeyer et al. | |
| 10,385,822 B2 | 8/2019 | Kullin et al. | |
| 2009/0214148 A1* | 8/2009 | Lemmers | F16C 35/077 384/517 |
| 2014/0219598 A1 | 8/2014 | Grosskopf et al. | |
| 2018/0191209 A1 | 7/2018 | Li et al. | |
| 2019/0186598 A1 | 6/2019 | Fisher et al. | |
| 2021/0156430 A1 | 5/2021 | Grosskopf | |

FOREIGN PATENT DOCUMENTS

| | | |
|---|---|---|
| FR | 2729442 A1 | 7/1996 |
| JP | S62196423 A | 8/1987 |

* cited by examiner

GENERATOR ASSEMBLIES, INTEGRATED DRIVE GENERATORS, AND METHODS OF MAKING GENERATOR ASSEMBLIES

CROSS REFERENCE TO RELATED APPLICATIONS

This application is a division of U.S. application Ser. No. 16/694,548, filed Nov. 25, 2019, the disclosure of which is incorporated by reference herein in its entirety.

BACKGROUND

The present disclosure is generally related to rotating machines, and more particularly to supporting rotors in in rotating machines like electrical generators.

Rotating machines, such as generators in aircraft electrical systems, commonly include a rotor. The rotor is generally supported for rotation relative to a stator by a bearing. The bearing restrains movement of the rotor to rotation about a rotation axis, typically by providing a sliding interface between a rotating bearing portion fixed relative to the rotor and a stationary bearing portion fixed relative to the stator portion. In some rotating machines a clearance is provided between the stationary bearing portion and the housing to facilitate assembly of rotating machine. Such clearances can allow the bearing to become misaligned during service, increase loading on the bearing in rotating machines having eccentrically rotating loads, and/or increase dynamic loading of the bearing by reducing frequency spacing between the bearing natural frequency and the rotational speed of the rotating machine.

Such systems and methods have generally been acceptable for their intended purpose. However, there remains a need in the art for improved generator assemblies, integrated drive generators, and methods of making generator assemblies and integrated drive generators having generator assemblies.

BRIEF DESCRIPTION

A generator assembly is provided. The generator assembly includes a rotor carrying a magnetic element, a bearing assembly supporting the rotor for rotation about a rotation axis, a bearing support structure extending circumferentially about the bearing assembly and configured for fixation to a housing, and a sleeve member. The sleeve member is arranged radially between the bearing assembly and the bearing support structure to limit a clearance defined radially between the bearing assembly and the bearing support structure.

In addition to one or more of the features described above, or as an alternative, further embodiments of the generator assembly may include that the bearing assembly is a radial bearing assembly.

In addition to one or more of the features described above, or as an alternative, further embodiments of the generator assembly may include that the bearing assembly is a Conrad-type bearing assembly.

In addition to one or more of the features described above, or as an alternative, further embodiments of the generator assembly may include that the bearing assembly is a first bearing assembly and that the generator assembly includes a second bearing assembly supporting the rotor for rotation about the rotation axis.

In addition to one or more of the features described above, or as an alternative, further embodiments may include that the second bearing assembly is a straight bearing assembly.

In addition to one or more of the features described above, or as an alternative, further embodiments may include that the first bearing assembly is a radial bearing assembly or a Conrad-type bearing assembly.

In addition to one or more of the features described above, or as an alternative, further embodiments may include that the sleeve member has an annular body defining a wedge-shaped profile.

In addition to one or more of the features described above, or as an alternative, further embodiments of the generator assembly may include that the sleeve member has an inner end and an axially opposite outer end, the wedge-shaped profile tapering between the inner end and the outer end of the wedge-shaped profile.

In addition to one or more of the features described above, or as an alternative, further embodiments of the generator assembly may include that the annular body defines an axial slot extending axially through the annular body, the axial slot spanning the wedge-shaped profile.

In addition to one or more of the features described above, or as an alternative, further embodiments of the generator assembly may include that the bearing assembly has a bearing assembly axial width, the sleeve member has a sleeve member axial width, and that the sleeve member axial width is smaller than the bearing assembly axial width.

In addition to one or more of the features described above, or as an alternative, further embodiments of the generator assembly may include that the bearing assembly includes an outer race defining a chamfered face, the chamfered faced extending circumferentially about the outer race and seating thereon the sleeve member.

In addition to one or more of the features described above, or as an alternative, further embodiments of the generator assembly may include that the chamfered face is arranged on an outboard end of the bearing assembly.

In addition to one or more of the features described above, or as an alternative, further embodiments of the generator assembly may include that the outer race is an unbroken outer race and the bearing assembly includes an inner race extending circumferentially about the rotation axis and two or more spherical elements distributed circumferentially about the rotation axis between the inner race and the outer race of the bearing assembly.

In addition to one or more of the features described above, or as an alternative, further embodiments of the generator assembly may include a clamp arranged axially between the magnetic element and bearing support structure, the clamp fixed relative to the bearing support structure.

In addition to one or more of the features described above, or as an alternative, further embodiments of the generator assembly may include a housing with an interior enclosing the rotor, the bearing support structure arranged within the housing and fixing the bearing assembly to the housing.

An integrated drive generator is also provided. The integrated drive generator includes a generator assembly as described above and a constant speed drive. The constant speed drive is operably connected to the rotor of the generator assembly.

In addition to one or more of the features described above, or as an alternative, further embodiments of the integrated drive generator may include that the bearing assembly is a radial bearing assembly or a Conrad-type bearing assembly, the generator assembly further including a straight bearing assembly supporting the rotor for rotation about the rotation axis and arranged on a side of the magnetic element opposite the radial bearing assembly or the Conrad-type bearing assembly.

In addition to one or more of the features described above, or as an alternative, further embodiments of the integrated drive generator may include that the sleeve member has an annular body defining a wedge-shaped profile; the bearing assembly includes an outer race defining a chamfered face, the chamfered faced extending circumferentially about the outer race and seating thereon the sleeve member; and that the bearing assembly has a bearing assembly axial width, the sleeve member has a sleeve member axial width, and that the sleeve member axial width is smaller than the bearing assembly axial width.

A method of making a generator assembly is also provided. The method includes fixing a bearing support structure to a housing; arranging a sleeve member within the bearing support structure; and seating a bearing assembly within the bearing support structure, the bearing assembly supporting a rotor carrying a magnetic element for rotation about a rotation axis, and the bearing assembly and the bearing support structure defining therebetween a radial clearance. The sleeve member is translated axially along the rotation axis relative to bearing assembly to limit a clearance defined radially between the bearing assembly and the bearing support structure.

In addition to one or more of the features described above, or as an alternative, further embodiments of the method may include closing the clearance between the bearing assembly and the bearing support structure.

Technical effects of the present disclosure include the capability to close a clearance between a bearing assembly and a bearing support structure subsequent to assembly of the bearing assembly and support assembly within a generator. In certain examples the bearing support structure, bearing assembly, and rotor carrying a magnetic element are assembled within a housing with a clearance defined between the bearing support structure and the bearing assembly, and the clearance thereafter closed by driving the sleeve member axially to a position radially between the bearing assembly and the bearing support structure. In accordance with one or more examples closing the clearance reduces (or eliminates entirely) bearing misalignment, increases stiffness and/or natural frequency of the bearing, and limit amplification of loading on the bearing assembly due to eccentric rotation of the rotor.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
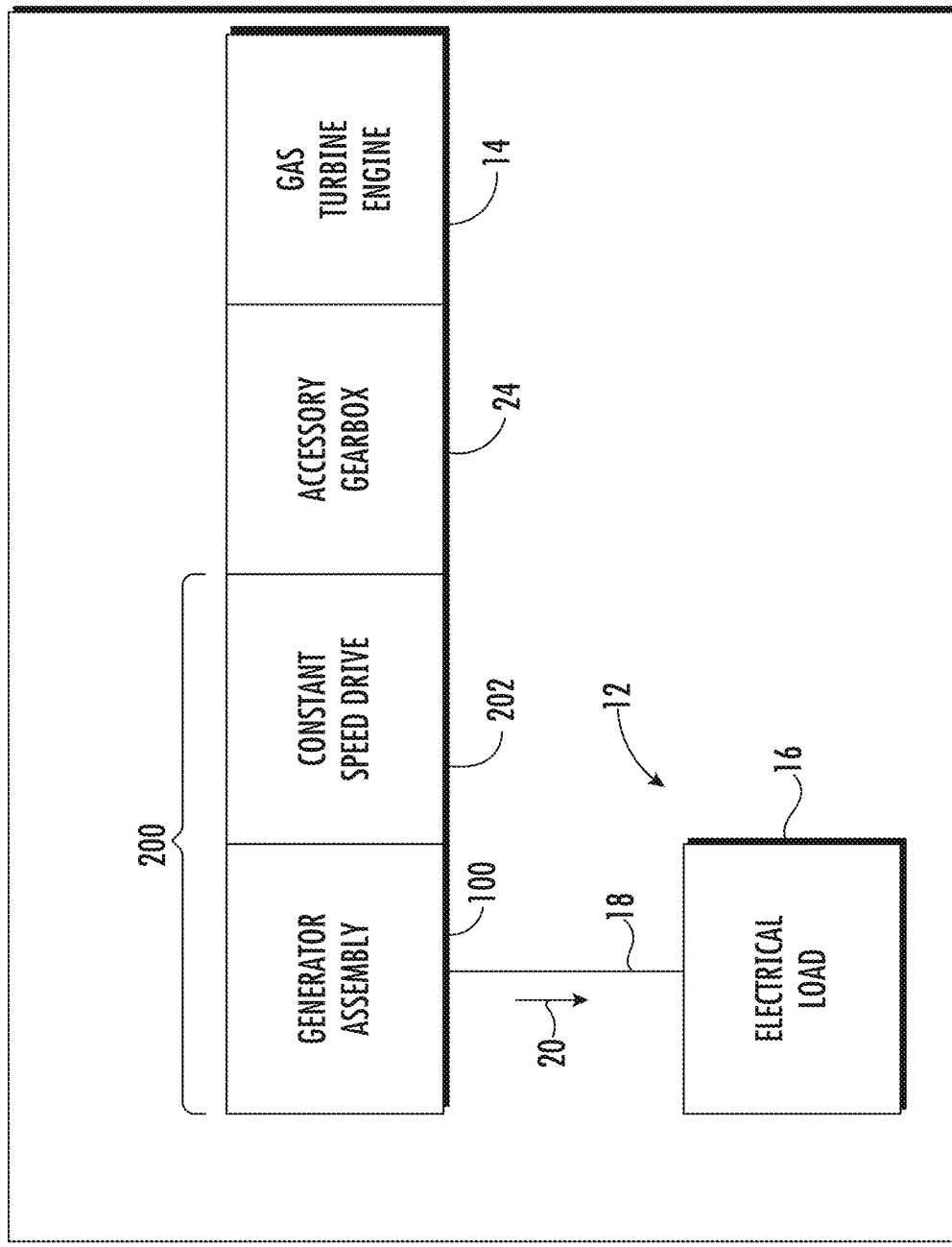
FIG. 1 is a schematic cross-sectional view of an aircraft carrying a generator assembly constructed in accordance with the present disclosure, showing an integrated drive generator having a generator assembly.

Reference will now be made to the drawings wherein like reference numerals identify similar structural features or aspects of the subject disclosure. For purposes of explanation and illustration, and not limitation, a partial view of an example of a generator assembly constructed in accordance with the disclosure is shown in FIG. 1 and is designated generally by reference character 100. Other embodiments of generator assemblies, integrated drive generators, and methods of making generator assemblies in accordance with the present disclosure, or aspects thereof, are provided in FIGS. 2-8, as will be described. The systems and methods described herein can be used to limit (or close entirely) clearances between bearing assemblies and bearing support structures in rotating machines, such as in integrated drive generators for aircraft electrical systems, though the present disclosure is not limited to integrated drive generators or to generators assemblies in general.

Referring to FIG. 1, a vehicle 10, e.g., an aircraft, is shown. The vehicle 10 includes an electrical system 12, a gas turbine engine 14, and a generator assembly 100. The electrical system 12 includes the generator assembly 100, an electrical load 16, and a power bus 18. The electrical load 16 is connected to the generator assembly 100 by the power bus 18. The generator assembly 100 is operably associated with the gas turbine engine 14 and is configured to generate electrical power 20 using mechanical rotation 22 (shown in FIG. 2) communicated thereto by the gas turbine engine 14. In certain examples the generator assembly 100 is operably associated with the gas turbine engine 14 through an accessory gearbox 24 to receive therethrough the mechanical rotation 22. In accordance with certain examples the generator assembly 100 is operably associated with the gas turbine engine 14 through a constant speed drive 202 as an integrated drive generator 200. Although shown and described herein in generator assembly for an aircraft it is to be understood and appreciated that other types of generators can benefit from the present disclosure.

Figure 2:
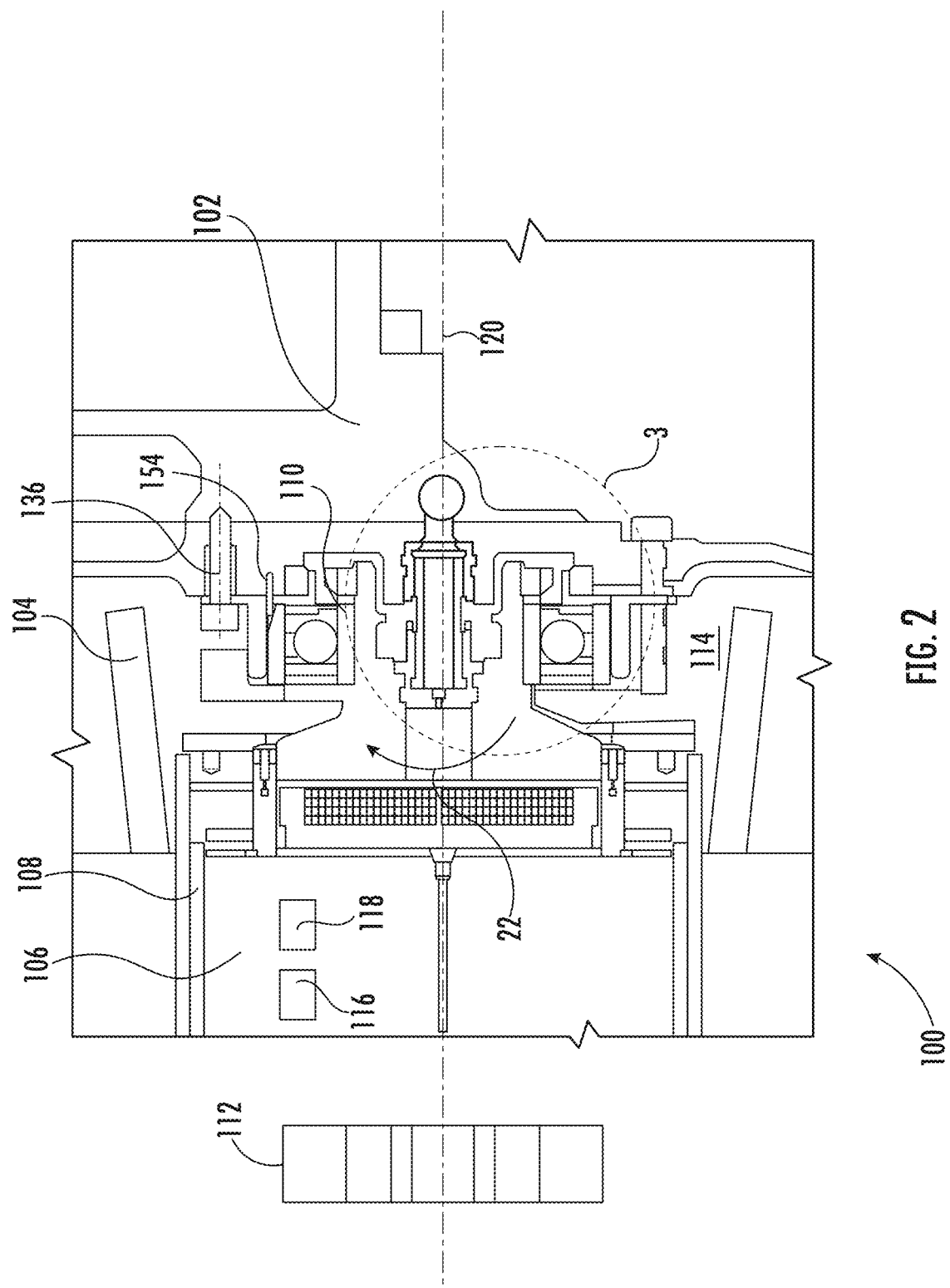
FIG. 2 is a schematic exploded view of the generator assembly of FIG. 1 according to an example, showing sleeve member and a clamp/bearing support structure assembly seating a first bearing assembly supporting a rotor of the generator assembly.

With reference to FIG. 2, the generator assembly 100 is shown. The generator assembly 100 includes a housing 102, a stator winding 104, and a rotor 106. The generator assembly 100 also includes a magnetic element 108, a first bearing assembly 110, and a second bearing assembly 112.

The housing 102 has an interior 114. The stator winding 104, the rotor 106, and magnetic element 108 are arranged within the interior 114 of the housing 102. The magnetic element 108, the first bearing assembly 110 and the second bearing assembly 112 are also arranged within the interior 114 of the housing 102.

The stator winding 104 is electrically connected to the power bus 18 (shown in FIG. 1) and is arranged with provide a flow of electric current. In this respect the stator winding 104 is electromagnetically coupled to the magnetic element 108 such that rotation of magnetic element 108 relative to the stator winding 104 induces a flow of electric current in the stator winding 104. In certain examples the flow of electric current is an alternating current (AC) flow.

The magnetic element 108 is fixed relative to the rotor 106. In certain examples the magnetic element 108 includes a permanent magnet 116. In accordance with certain examples the magnetic element 108 includes a winding 118. It is also contemplated that the magnetic element 108 can include both the permanent magnet 116 and the winding 118.

The rotor 106 is supported for rotation about a rotation axis 120 within the interior 114 of the housing 102 by the first bearing assembly 110 and the second bearing assembly 112. In certain examples the first bearing assembly 110 is a radial bearing assembly, e.g., a ball bearing assembly. In accordance with certain examples the second bearing assembly 112 is a straight bearing assembly. Straight bearing assemblies allow the rotor 106 to slide axially in response to heating of the generator assembly 100 during operation, such as due to differential between elongation of the rotor 106 and the housing 102 during operation. Although shown and described herein as having a radial bearing assembly and a straight bearing assembly, it is to be understood and appreciated that rotating machines having other types of bearing assemblies can also benefit from the present disclosure.

Figure 3:
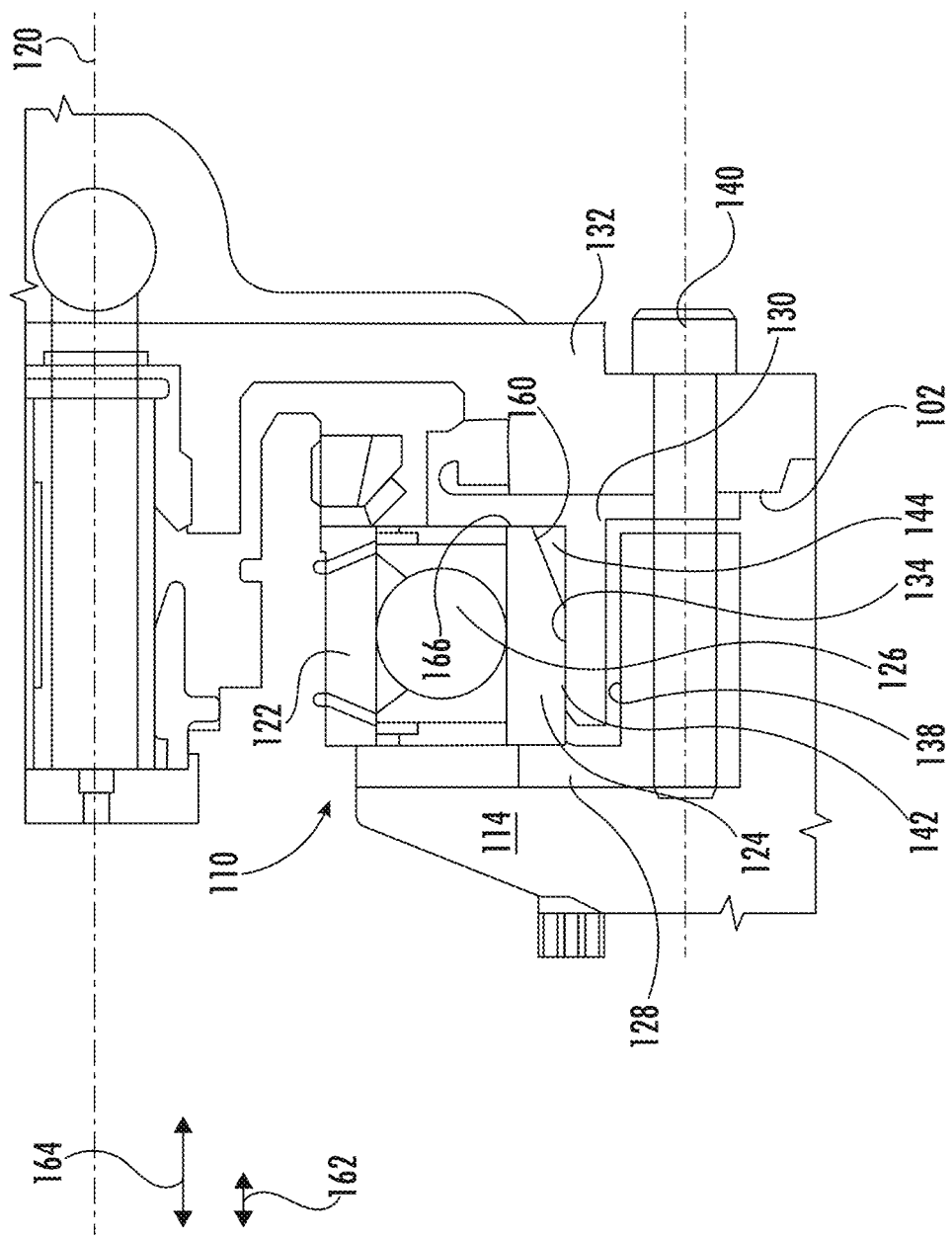
FIG. 3 is a cross-sectional side view of a portion of the generator assembly of FIG. 1 according to the example, showing first bearing assembly captive within the clamp/bearing support structure assembly with the sleeve member.

With reference to FIG. 3, a portion of the generator assembly 100 is shown including the first bearing assembly 110. The first bearing assembly 110 includes an inner race 122, an outer race 124, and a plurality of spherical elements 126. The inner race 122 is fixed in rotation relative to the rotor 106 for rotation with the rotor 106 about the rotation axis 120. The plurality of spherical elements 126 are distributed circumferentially about the inner race 122 and the rotation axis 120. The outer race 124 extends circumferentially about the inner race 122 and the plurality of spherical elements 126, and is configured for fixation relative to the housing 102. Fixation of the first bearing assembly 110 to the housing 102 is accomplished by a clamp 128, a bearing support structure 130, and a retainer 132. In certain examples the outer race 124 can be an unbroken race, limiting load on the first bearing assembly 110 and thereby extending the expected service life of the first bearing assembly 110.

The bearing support structure 130 is fixed within the interior 114 of the housing 102 and has a bearing seat 134. The bearing seat 134 radially bounds the first bearing assembly 110, extends thereabout, and seats thereon the first bearing assembly 110. A plurality of first fasteners 136 (shown in FIG. 2) extend through the bearing support structure 130 and threadably fixes the bearing support structure 130 to the housing 102 and about the rotation axis 120.

The clamp 128 is arranged within the interior 114 of the housing 102 and has a bearing support structure seat 138. The bearing support structure seat 138 radially bounds the bearing support structure 130, extends about the bearing support structure 130, and seats thereon the bearing support structure 130. A plurality of second fasteners 140 extend though the retainer 132 and the housing 102 to threadably fix the clamp 128 against the bearing support structure 130 with the first bearing assembly 110 captive between the clamp 128 and the bearing support structure 130. A radial clearance 142 is defined between the outer race 124 and of the first bearing assembly 110 and the bearing support structure 130.

As will be appreciated by those of skill in the art in view of the presented disclosure, the clearance 142 facilitates assembly of the generator assembly 100 by allowing the bearing support structure 130 to be fixed with the interior 114 of the housing 102 and receive thereon the rotor 106 and the first bearing assembly 110 with the clamp 128 mounted thereon. As will also be appreciated by those of skill in the art in view of the present disclosure, such clearances can, in some generator assemblies, limit reliability of the generator assembly. For example, clearances can allow the bearing assembly to become misaligned relative to the rotation axis, increasing the load exerted on the bearing assembly. Clearances can also reduce the stiffness provided by the bearing assembly, limiting the frequency spacing between the bearing assembly and the nominal speed of rotor such that dynamic loading of the bearing assembly, potentially reducing service life of the bearing assembly. And in some generators such clearances can allow the outer race to orbit relative to the generator stator—the orbiting in turn causing fretting wear occurring and/or generating debris, posing a foreign object damage hazard. To limit misalignment, increase stiffness, and/or present orbiting the generator assembly 100 includes the sleeve member 144.

The sleeve member 144 is arranged radially between the first bearing assembly 110 the bearing support structure 130. More specifically, the sleeve member 144 is arranged between the outer race 124 of the first bearing assembly 110 and the bearing seat 134 of the bearing support structure 130 to limit (or close entirely) the radial clearance 142. Limiting (or closing entirely) the radial clearance 142 fixes the outer race 124 of the first bearing assembly 110 relative to the bearing support structure 130, reducing (or eliminating entirely) misalignment of the first bearing assembly 110 relative to the rotation axis 120, stiffening the first bearing assembly 110, and/or preventing orbiting of the outer race 124 relative to the bearing support structure 130. It is contemplated that the radial clearance 142 be limited (or closed entirely) subsequent to the assembly of the rotor 106 (carrying the first bearing assembly 110 and the clamp 128 thereon), the radial clearance 142 thereby facilitating assembly of the generator assembly 100 prior to being limited (or closed entirely).

Figure 4:
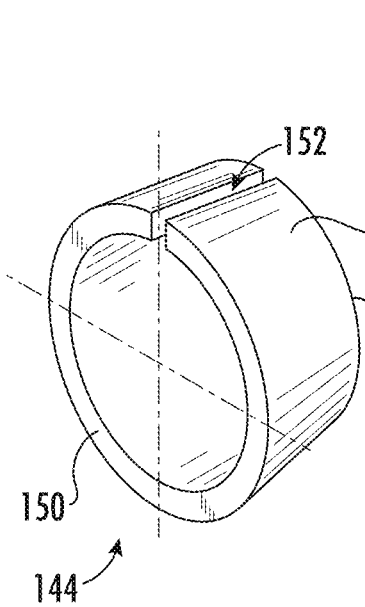
FIGS. 4-6 are perspective, end and cross-sectional views of the sleeve member of FIG. 3, showing an axial slot and a wedge-shaped profile defined by the sleeve member for closing a radial clearance defined between the clamp/bearing support structure assembly and the bearing assembly.
Figure 5:
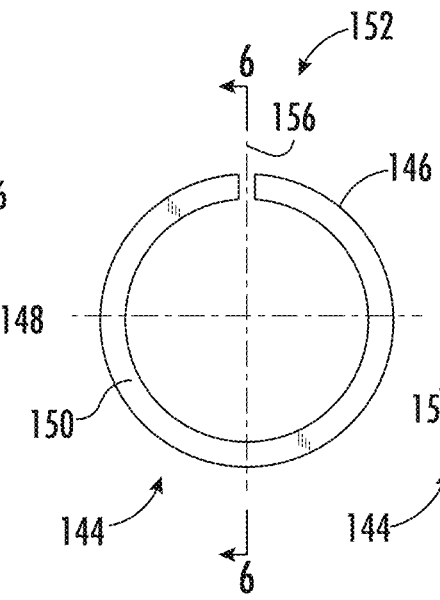
Figure 6:
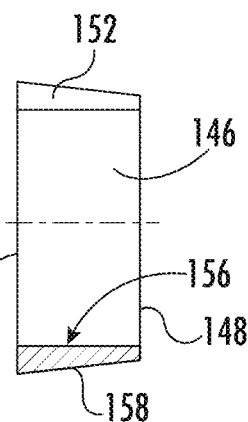

With reference to FIGS. 4-6, the sleeve member 144 is shown. As shown in FIG. 4, the sleeve member 144 includes an annular body 146 having an inboard edge 148, an outboard edge 150, and a defines a slot 152 extending between the inboard edge 148 and the outboard edge 150. The outboard edge 150 is arranged to abut the bearing support structure 130 (shown in FIG. 2) within the interior 114 (shown in FIG. 2) of the housing 102 (shown in FIG. 2) when the sleeve member 144 is installed within the generator assembly 100 (shown in FIG. 1). The inboard edge 148 is arranged to oppose the clamp 128 (shown in FIG. 2) within the interior 114 of the housing 102 when the sleeve member 144 is installed within the generator assembly 100 such that the clamp 128 is arranged axially between the sleeve member 144 and the magnetic element 108 (shown in FIG. 2). It is contemplated that the slot 152 extend substantially in parallel with the rotation axis 120 (shown in FIG. 2) and between the bearing support structure 130 and the clamp 128.

As shown in FIG. 5, the annular body 146 extends circumferentially about the rotation axis 120 (shown in FIG. 2) such that the outboard edge 150 is radially offset from the rotation axis 120. In certain examples the sleeve member 144 is clocked about the rotation axis 120 such that slot 152 is positioned above the rotation axis 120 relative to gravity. In accordance with certain examples the sleeve member 144 can be seated within the interior 114 of the housing 102 such that the slot receives a pin 154, fixed relative to the housing 102, to fix position of the sleeve member 144 about the rotation axis 120 during assembly of the generator assembly 100 (shown in FIG. 1).

As shown in FIG. 6, the sleeve member 144 has a wedge-shaped profile 156. The wedge-shaped profile 156 extends axially between the inboard edge 148 and the outboard edge 150. It is contemplated that the wedge-shaped profile 156 taper between the inboard edge 148 and the outboard edge 150, the inboard edge 148 having a smaller surface area than the surface area of the outboard edge 150. In certain examples the sleeve member 144 is formed from a metallic material 158. In accordance with certain examples the metallic material 158 has a coefficient of thermal expansion that corresponds to the coefficient of thermal expansion of the first bearing assembly 110, the bearing support structure 130, and/or the clamp 128 such that clearance remains limited (or closed) during heating and cooling of the generator assembly 100 during operation.

Figure 7:
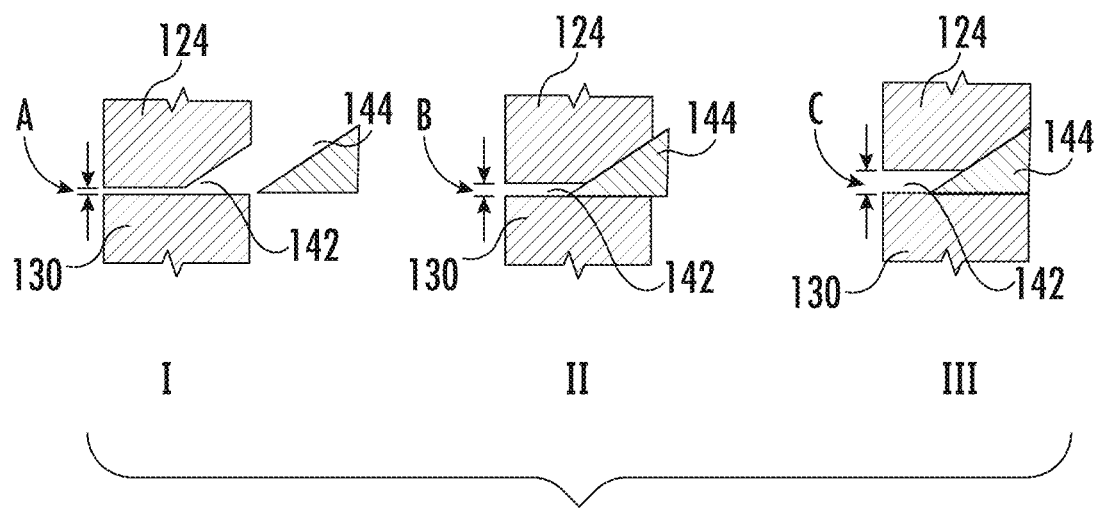
FIG. 7 is a schematic view of a sleeve member arranged radially between the bearing assembly and the bearing support structure of the generator assembly of FIG. 1, showing the sleeve member translating relative to the bearing assembly between the bearing assembly and the bearing support structure.

With continuing reference to FIGS. 3 and 7, the sleeve member 144 seats radially between the first bearing assembly 110 and the bearing support structure 130. More specifically, the sleeve member 144 is radially interposed between the outer race 124 of the first bearing assembly 110 and the bearing support structure 130. In certain examples the outer race 124 has radially-outer chamfer 160. In certain examples the sleeve member 144 has a sleeve member axial width 162 that is smaller than a bearing member axial width 164. In accordance with certain examples the radially-outer chamfer 160 is defined on an axially outer edge 166 of the outer race 124 such that a radially outer face 168 (shown in FIG. 4) of the sleeve member 144 is substantially parallel to the rotation axis 120.

As shown in FIG. 7, the radially-outer chamfer 160 cooperates with the wedge-shaped profile 156 such that, as the sleeve member 144 translates axially along the rotation axis 120 during assembly, the radial clearance 142 decreases in radial width (or closes entirely) such that the outer race 124 of the first bearing assembly 110 is fixed in rotation relative to the bearing support structure 130. In this respect, as shown at reference I, seating the first bearing assembly 110 within the bearing support structure 130 causes the first bearing assembly 110 and the bearing support structure 130 to define a first gap width A between one another. As shown at reference II, translating the sleeve member 144 along the rotation axis 120 relative to the first bearing assembly 110 causes the first bearing assembly 110 and the bearing support structure 130 to define between a second gap width B between one another, the second gap width B larger than the first gap width A—limiting the radial clearance 142 between the first bearing assembly 110 and the bearing support structure 130. In certain examples the radial clearance 142 is closed by translating the sleeve member 144 along the rotation axis 120 such that the first bearing assembly 110 and the bearing support structure 130 define a third gap width between one another, the third gap width C larger than the second gap width B.

Figure 8:
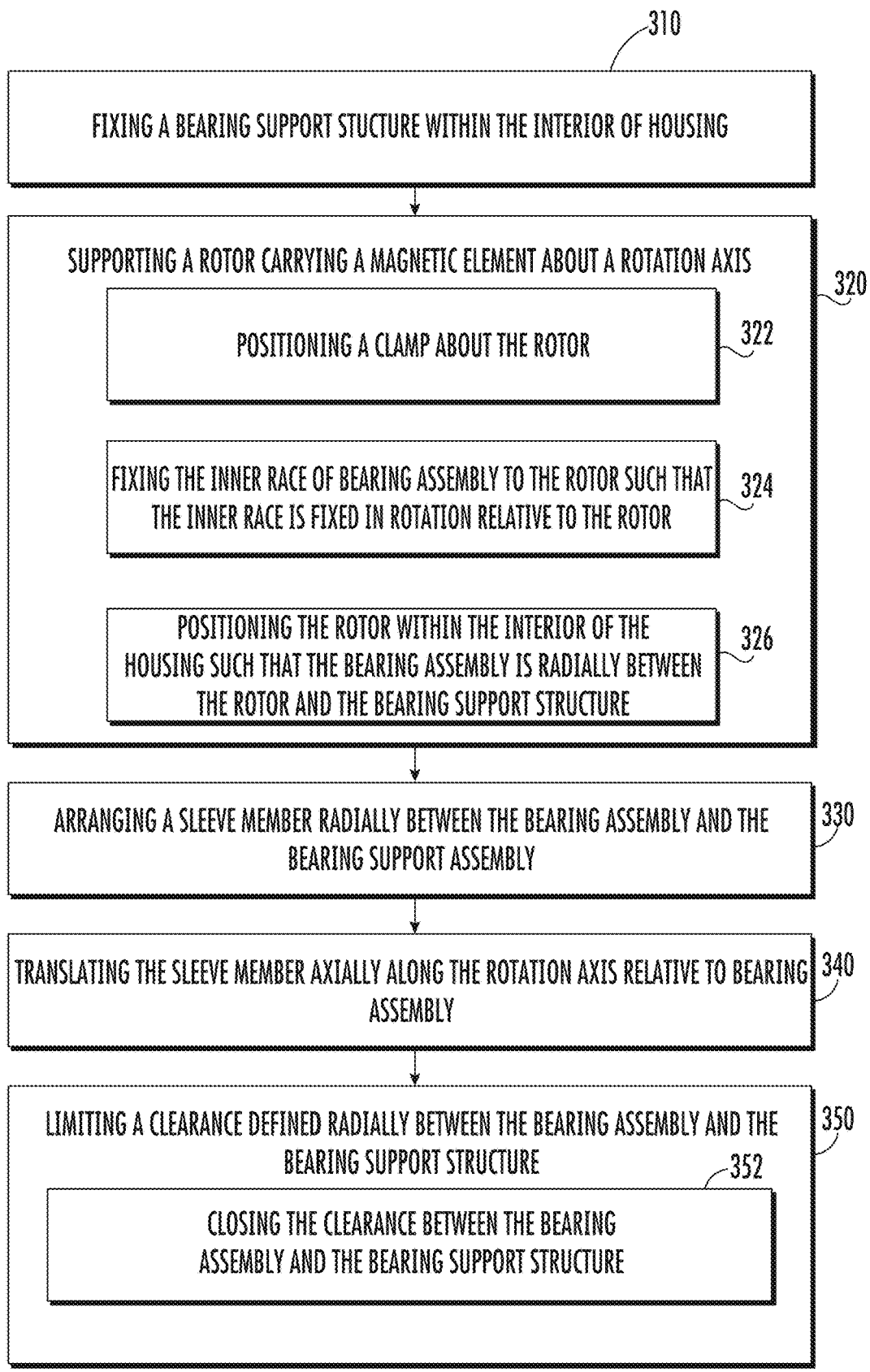
FIG. 8 is a block diagram of a method of making a generator assembly, showing operations of the method according to an illustrative and non-limiting example of the method.

With reference to FIG. 8, a method 300 of making a generator assembly, e.g., the generator assembly 100 (shown in FIG. 1), is shown. As shown with box 310, the method 300 includes fixing a bearing support structure within the interior of a housing for a generator assembly, e.g., the bearing support structure 130 (shown in FIG. 2) within the interior 114 (shown in FIG. 2) of the housing 102 (shown in FIG. 2). Fixation can be accomplished by fastening the bearing support structure within the interior of the housing, e.g., with the plurality of first fasteners 136 (shown in FIG. 2).

As shown with box 320, the method 300 also includes supporting a rotor carrying a magnetic element about a rotation axis within the housing, e.g., the rotor 106 (shown in FIG. 2) carrying the magnetic element 108 (shown in FIG. 2). A clamp, e.g., the clamp 128 (shown in FIG. 2), is positioned about the rotor, as shown with box 222. An inner race of bearing assembly, the inner race 122 (shown in FIG. 3) of the first bearing assembly 110 (shown in FIG. 2), is fixed to the rotor such that the inner race is fixed in rotation relative to the rotor, as shown with box 224. The rotor, including the clamp and the bearing assembly, is positioned within the housing such that the bearing assembly is arranged radially between the rotor and the bearing support structure with a clearance, e.g., the radial clearance 142 (shown in FIG. 3), is defined therebetween, as shown with box 326.

As shown with box 330, a sleeve member, e.g., the sleeve member 144 (shown in FIG. 3), is arranged radially between the bearing assembly and the bearing support structure. The sleeve member 144 is translated along the rotation axis relative to the bearing assembly, as shown with box 340. As the sleeve member translates along the rotation axis relative to the bearing assembly the sleeve member limits the clearance defined between the bearing assembly and the bearing support structure, as shown with box 350, e.g., by making a radial distance between the bearing assembly and the bearing support structure smaller. In certain examples the clearance between the bearing assembly and the bearing support structure is closed, e.g., such that no radial distance is defined between the bearing assembly and the bearing support structure, as shown by box 352. In accordance with certain examples closing the clearance by translating the sleeve member relative to the bearing assembly can create an interference fit between the sleeve member and either (or both) the bearing assembly and bearing support structure.

Rotating machines commonly employ bearings to support rotary components for rotation relative to stationary components. In some rotating machines there can be clearance between the bearing and the stationary portion of the rotating machine, the clearance enabling assembly of the rotating machine. While generally acceptable for its intended purpose clearance between the bearing and stationary components of the rotating machine increase eccentric loading of the bearing, potentially reducing the expect service life of the bearing. Clearance between the bearing and stationary components of the rotating machine can also result in misalignment of the bearing, also potentially limiting the expected service life of the bearing. And clearance between the bearing and the stationary components can also reduce bearing life due to misalignment and/or stiffness variation in intermediate structures supporting the bearing relative to other stationary structures.

In examples described herein a portion of clearance between the bearing and the stationary structure of a rotating machine, e.g., a generator, is closed subsequent to assembly of the rotor within the stator of the rotating machine. In certain examples sleeve is arranged between the bearing and the stator of the rotating machine. The sleeve can be closed under outside and opened under inside pressure such that the sleeve diameter can be changed, i.e., be made smaller or larger, depending upon the pressure applied to the sleeve. In accordance with certain examples, when the sleeve is installed between the bearing and stationary structure such as a bearing support the sleeve diameter will self-adjust to the inner diameter of the bearing support. Self-adjustment can be accomplished, for example, by clamping the sleeve between the stationary structure and a retaining plate. It also contemplated that, in accordance with certain examples, that the material forming the sleeve be selected such that thermal expansion of the sleeve corresponds, e.g., matches, that of thermal expansion of the bearing.

Technical effects of the present disclosure can include limiting (or preventing entirely) distortion of the outer race of the bearing. Technical effects also include delaying (or preventing entirely) the tendency of the bearing to orbit within, and frictionally against, the seat defined by the stationary structure—limiting (or preventing entirely) the generation of debris from the orbiting which can otherwise present a foreign object damage hazard to the rotating machine. Technical effects additionally the employment of bearings having unbroken (non-broken) outer races.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of making a generator assembly, comprising:
   fixing a bearing support structure to a housing;
   arranging a sleeve member within the bearing support structure, wherein the sleeve member has a wedge-shaped profile with a flat inner surface and a sloped outer surface;
   wherein the sleeve member has an inner end and an axially opposite outer end, wherein the wedge-shaped profile tapers between the inner end and the outer end of the wedge-shaped profile;
   seating a bearing assembly within the bearing support structure, the bearing assembly supporting a rotor carrying a magnetic element for rotation about a rotation axis, the bearing assembly and the bearing support structure defining therebetween a radial clearance; and
   translating the sleeve member axially along the rotation axis relative to bearing assembly to limit a clearance defined radially between the bearing assembly and the bearing support structure.

2. The method of claim 1, wherein limiting the clearance includes closing the clearance between the bearing assembly and the bearing support structure.

3. The method of claim 1, wherein the bearing assembly is a radial bearing assembly.

4. The method of claim 1, wherein the bearing assembly is a Conrad-type bearing assembly.

5. The method of claim 1, wherein the bearing assembly is a Conrad-type bearing assembly.

6. The method of claim 1, wherein the bearing assembly is a first bearing assembly; and
   the method further comprising includes seating a second bearing within the bearing support structure such that it also supports the rotor for rotation about the rotation axis.

7. The method of claim 6, wherein the second bearing assembly is a Conrad-type bearing assembly.

8. The method of claim 6, wherein the first bearing assembly is a radial bearing assembly or a Conrad-type bearing assembly.

9. The method of claim 1, wherein the annular body defines an axial slot extending axially through the annular body, the axial slot spanning the wedge-shaped profile.

10. The method of claim 1, wherein the bearing assembly has a bearing assembly axial width, wherein the sleeve member has a sleeve member axial width, and wherein the sleeve member axial width is smaller than the bearing assembly axial width.

11. The method of claim 1, wherein the bearing assembly comprises an outer race defining a chamfered face, the chamfered faced extending circumferentially about the outer race and seating thereon the sleeve member.

12. The method of claim 11, wherein the chamfered face is arranged on an outboard end of the bearing assembly.

13. The method of claim 11, wherein the outer race is an unbroken outer race, the bearing assembly further comprising:
    an inner race extending circumferentially about the rotation axis; and
    a plurality of spherical elements distributed circumferentially about the rotation axis and between the inner race and the outer race of the bearing assembly.

14. The method of claim 1, further comprising:
    arranging a clamp axially between the magnetic element and bearing support structure, the clamp fixed relative to the bearing support structure.

* * * * *